US012632922B2

(12) United States Patent
Kristensen et al.

(10) Patent No.: US 12,632,922 B2
(45) Date of Patent: May 19, 2026

(54) IMAGE STITCHING WITH SACCADE-BASED CONTROL OF DYNAMIC SEAM PLACEMENT FOR SURROUND VIEW VISUALIZATION

(71) Applicant: NVIDIA Corporation, Santa Clara, CA (US)

(72) Inventors: Steen Kristensen, Santa Clara, CA (US); Simon Kiefhaber, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 436 days.

(21) Appl. No.: 17/969,514

(22) Filed: Oct. 19, 2022

(65) Prior Publication Data

US 2024/0135487 A1    Apr. 25, 2024
US 2024/0233072 A9    Jul. 11, 2024

(51) Int. Cl.
     *G06T 3/4038*      (2024.01)
     *G06F 3/01*        (2006.01)

(52) U.S. Cl.
     CPC ............ *G06T 3/4038* (2013.01); *G06F 3/013* (2013.01)

(58) Field of Classification Search
     CPC ................................ G06T 3/4038; G06F 3/13
                (Continued)

(56) References Cited

U.S. PATENT DOCUMENTS 771,104 A      9/1904   John
5,751,838 A    5/1998   Cox et al.
              (Continued)

FOREIGN PATENT DOCUMENTS

CN    107888894 A    4/2018
CN    113905176 A    1/2022
              (Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Gabriel I Garcia
(74) *Attorney, Agent, or Firm* — Freestone Intellectual Property Law PLLC; Wesley Horner

(57)          ABSTRACT

In various examples, a stitched image may be generated from overlapping image frames using a dynamic seam placement that depends on scene content and/or other factors. Since an optimized seam placement may jump from a previous location from time slice to time slice, one or more constraints may be applied to limit the movement of dynamically placed seams such that any given seam moves gradually over time, limiting potential discontinuities in a visualization of the stitched image on a display. Eye tracking may be used to detect a saccade of a monitored person and/or detect that the monitored person is not looking at the display, and one or more of the constraints used to limit the movement of dynamically placed seams may be relaxed or lifted when the monitored person is experiencing a saccade and/or is looking away from the display.

20 Claims, 15 Drawing Sheets

100

(58) Field of Classification Search

USPC ........................................................ 382/284

See application file for complete search history.

(56) References Cited

U.S. PATENT DOCUMENTS

| | | | |
|---|---|---|---|
| 6,704,621 | B1 | 3/2004 | Stein et al. |
| 7,333,963 | B2 | 2/2008 | Widrow et al. |
| 7,571,030 | B2 | 8/2009 | Ryu et al. |
| 7,711,044 | B1 | 5/2010 | Hoang et al. |
| 8,213,706 | B2 | 7/2012 | Krishnaswamy et al. |
| 8,321,168 | B2 | 11/2012 | Eriksson |
| 9,007,428 | B2 | 4/2015 | Zhou |
| 9,315,152 | B1 | 4/2016 | Maestas et al. |
| 9,516,223 | B2 | 12/2016 | Zhou et al. |
| 10,262,466 | B2 | 4/2019 | Guo et al. |
| 10,776,928 | B1 | 9/2020 | Horvath et al. |
| 10,866,427 | B2 | 12/2020 | Jung et al. |
| 10,885,698 | B2 | 1/2021 | Muthler et al. |
| 11,144,754 | B2 | 10/2021 | Hu et al. |
| 11,225,193 | B2 | 1/2022 | Chen et al. |
| 11,760,268 | B1 | 9/2023 | McGirt, Jr. et al. |
| 11,778,224 | B1 | 10/2023 | Vanam et al. |
| 2007/0221822 | A1 | 9/2007 | Stein et al. |
| 2009/0015675 | A1 | 1/2009 | Yang |
| 2009/0182690 | A1 | 7/2009 | Stein |
| 2010/0040290 | A1 | 2/2010 | Lei |
| 2011/0211749 | A1 | 9/2011 | Tan et al. |
| 2011/0293142 | A1 | 12/2011 | van der Mark et al. |
| 2012/0081577 | A1 | 4/2012 | Cote et al. |
| 2012/0105639 | A1 | 5/2012 | Stein et al. |
| 2013/0329072 | A1 | 12/2013 | Zhou et al. |
| 2014/0247352 | A1 | 9/2014 | Rathi et al. |
| 2014/0247365 | A1 | 9/2014 | Gardner et al. |
| 2014/0300623 | A1 | 10/2014 | Kim |
| 2014/0347486 | A1 | 11/2014 | Okouneva |
| 2014/0364227 | A1 | 12/2014 | Langlois et al. |
| 2015/0070523 | A1 | 3/2015 | Chao |
| 2015/0143913 | A1 | 5/2015 | Adams et al. |
| 2015/0172620 | A1 | 6/2015 | Guo et al. |
| 2015/0329048 | A1 | 11/2015 | Wang et al. |
| 2015/0332446 | A1 | 11/2015 | Wang et al. |
| 2016/0006943 | A1 | 1/2016 | Ratnakar |
| 2017/0109940 | A1 | 4/2017 | Guo et al. |
| 2017/0140791 | A1 | 5/2017 | Das et al. |
| 2017/0148223 | A1 | 5/2017 | Holzer et al. |
| 2017/0158131 | A1 | 6/2017 | Friebe |
| 2017/0310979 | A1 | 10/2017 | Shaw et al. |
| 2017/0330034 | A1 | 11/2017 | Wang et al. |
| 2017/0372147 | A1 | 12/2017 | Stervik et al. |
| 2017/0372682 | A1 | 12/2017 | Hashikawa et al. |
| 2018/0007263 | A1 | 1/2018 | Vandrotti et al. |
| 2018/0210442 | A1 | 7/2018 | Guo et al. |
| 2018/0225833 | A1 | 8/2018 | Cao et al. |
| 2018/0244199 | A1 | 8/2018 | Gyori et al. |
| 2018/0253875 | A1 | 9/2018 | Gorur Sheshagiri et al. |
| 2018/0286026 | A1 | 10/2018 | Fan et al. |
| 2019/0050959 | A1* | 2/2019 | Husted ..................... B60R 1/27 |
| 2019/0080476 | A1 | 3/2019 | Ermilios et al. |
| 2019/0082103 | A1 | 3/2019 | Banerjee et al. |
| 2019/0272619 | A1 | 9/2019 | Lim et al. |
| 2019/0289223 | A1 | 9/2019 | Abbas et al. |
| 2019/0361436 | A1 | 11/2019 | Ueda et al. |
| 2019/0377181 | A1 | 12/2019 | Myhre et al. |
| 2020/0005649 | A1 | 1/2020 | Kim et al. |
| 2020/0020075 | A1 | 1/2020 | Khwaja et al. |
| 2020/0034953 | A1 | 1/2020 | Friebe et al. |
| 2020/0150677 | A1 | 5/2020 | Walters et al. |
| 2020/0174130 | A1 | 6/2020 | Banerjee et al. |
| 2020/0265622 | A1 | 8/2020 | Pettersson et al. |
| 2020/0293796 | A1 | 9/2020 | Sajjadi Mohammadabadi et al. |
| 2020/0371016 | A1 | 11/2020 | Guillou et al. |
| 2021/0042705 | A1 | 2/2021 | Suen et al. |
| 2021/0065461 | A1 | 3/2021 | Reif |
| 2021/0073997 | A1 | 3/2021 | Vora et al. |
| 2021/0179086 | A1 | 6/2021 | Yamanaka et al. |
| 2021/0182609 | A1 | 6/2021 | Arar et al. |
| 2021/0182625 | A1 | 6/2021 | Arar et al. |
| 2021/0183072 | A1 | 6/2021 | Puri |
| 2021/0286923 | A1 | 9/2021 | Kristensen et al. |
| 2021/0334565 | A1 | 10/2021 | Roche et al. |
| 2022/0078390 | A1 | 3/2022 | Jingu |
| 2022/0121867 | A1 | 4/2022 | Arar et al. |
| 2022/0144260 | A1 | 5/2022 | Chen et al. |
| 2022/0414822 | A1* | 12/2022 | Lu ........................ H04N 5/2628 |
| 2023/0024474 | A1* | 1/2023 | Ren ........................ H04N 23/90 |
| 2023/0048926 | A1 | 2/2023 | Kurbiel et al. |
| 2023/0117253 | A1 | 4/2023 | Molad et al. |
| 2023/0166659 | A1 | 6/2023 | Hariyani et al. |
| 2023/0245463 | A1 | 8/2023 | Varma et al. |
| 2023/0272998 | A1 | 8/2023 | Lee |

FOREIGN PATENT DOCUMENTS

| | | | | |
|---|---|---|---|---|
| CN | 117940319 | A * | 4/2024 | .............. B60R 1/27 |
| EP | 2709069 | A1 | 3/2014 | |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

U.S. Appl. No. 16/363,648, "Managing Glare in Image Detection Using Artificial Intelligence," filed Mar. 25, 2019.

Non-Final Office Action, U.S. Appl. No. 18/313,121, Notification Date: Jul. 25, 2025, 12 pages.

https://www.youtube.com/watch?v=bPe0_DHIj4A Marcos HIDO (Year: 2020).

Non-Final Office Action, U.S. Appl. No. 18/173,623, Notification Date: Apr. 24, 2025, 22 pages.

Non-Final Office Action, U.S. Appl. No. 18/173,623, Notification Date: Jul. 1, 2025, 27 pages.

Non-Final Office Action, U.S. Appl. No. 18/173,630, Notification Date: Jun. 26, 2025, 25 pages.

Non-Final Office Action, U.S. Appl. No. 18/352,989, Notification Date: May 14, 2025, 13 pages.

Non-Final Office Action, U.S. Appl. No. 18/173,0623, Notification Date: Dec. 30, 2024, 19 pages.

Non-Final Office Action, U.S. Appl. No. 18/173,165 Notification Date: Jul. 2, 2025, 22 pages.

Non-Final Office Action, U.S. Appl. No. 18/173,589 Notification Date: Jun. 13, 2025, 31 pages.

Non-Final Office Action, U.S. Appl. No. 18/173,603, Notification Date: Jun. 17, 2025, 26 pages.

Non-Final Office Action, U.S. Appl. No. 18/353,441, Notification Date: May 15, 2025, 16 pages.

Final Office Action, U.S. Appl. No. 18/173,589, Notification Date: Oct. 7, 2025, 34 pages.

Notice of Allowance, U.S. Appl. No. 18/352,989, Notification Date: Sep. 12, 2025, 8 pages.

Final Office Action, U.S. Appl. No. 18/173,630, Notification Date: Nov. 28, 2025, 21 pages.

Notice of Allowance U.S. Appl. No. 18/173,623, Notification Date: Dec. 5, 2025, 8 pages.

Final Office Action, U.S. Appl. No. 18/353,441, Notification Date: Nov. 14, 2025, 13 pages.

Final Office Action, U.S. Appl. No. 18/173,615, Notification Date: Nov. 25, 2025, 20 pages.

(56)        References Cited

OTHER PUBLICATIONS

Non-Final Office Action, U.S. Appl. No. 18/173,589, Notification Date: Feb. 23, 2026, 34 pages.
Non-Final Office Action, U.S. Appl. No. 18/313,121, Notification Date: Mar. 11, 2026, 13 pages.
Non-Final Office Action, U.S. Appl. No. 18/173,603, Notification Date: Mar. 9, 2026, 26 pages.

* cited by examiner

100
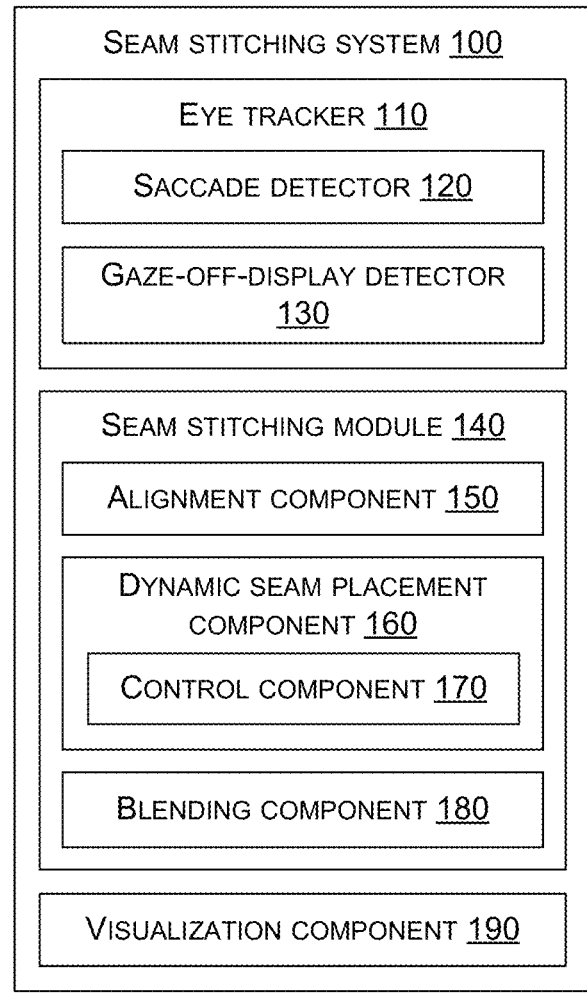
SEAM STITCHING SYSTEM 100
EYE TRACKER 110
SACCADE DETECTOR 120
GAZE-OFF-DISPLAY DETECTOR 130
SEAM STITCHING MODULE 140
ALIGNMENT COMPONENT 150
DYNAMIC SEAM PLACEMENT COMPONENT 160
CONTROL COMPONENT 170
BLENDING COMPONENT 180
VISUALIZATION COMPONENT 190
FIGURE 1

310

320

500

GENERATE, BASED AT LEAST ON EYE TRACKING, AN INDICATOR REPRESENTING WHETHER A MONITORED PERSON IS EXPERIENCING A SACCADE OR WHETHER THE MONITORED PERSON IS LOOKING AWAY FROM A DISPLAY
B502

DETERMINE, BASED AT LEAST ON THE INDICATOR, A DYNAMIC SEAM PLACEMENT FOR A SEAM IN AN OVERLAPPING REGION OF TWO OR MORE ALIGNED IMAGE FRAMES
B504

GENERATE A VISUALIZATION COMPOSITE IMAGE FRAME BASED AT LEAST ON STITCHING IMAGE DATA OF THE TWO OR MORE ALIGNED IMAGE FRAMES USING THE DYNAMIC SEAM PLACEMENT FOR THE SEAM
B506

CAUSE THE DISPLAY TO PRESENT A REPRESENTATION OF THE VISUALIZATION COMPOSITE IMAGE FRAME
B508

FIGURE 5

600

GENERATE, USING EYE TRACKING, AN INDICATOR OF
WHETHER A DISPLAY IS BEING OBSERVED BY A
MONITORED OPERATOR OR OCCUPANT OF AN
EGO-OBJECT IN AN ENVIRONMENT
B602

DETERMINE, BASED AT LEAST ON THE INDICATOR,
A DYNAMIC SEAM PLACEMENT FOR A SEAM IN AN
OVERLAPPING REGION OF TWO OR MORE ALIGNED
IMAGE FRAMES REPRESENTING OVERLAPPING VIEWS
OF THE ENVIRONMENT
B604

GENERATE A COMPOSITE IMAGE FRAME BASED AT
LEAST ON STITCHING IMAGE DATA OF THE TWO OR
MORE ALIGNED IMAGE FRAMES USING THE DYNAMIC
SEAM PLACEMENT FOR THE SEA
B606

CAUSE THE DISPLAY TO PRESENT A
REPRESENTATION OF THE COMPOSITE IMAGE FRAME
B608

FIGURE 6

STEREO CAMERA 768

MID-RANGE CAMERA, WING MIRROR MOUNT 798

SURROUND CAMERA 774

MID-RANGE CAMERA, WING MIRROR MOUNT 798

SURROUND CAMERA(S) 774

700

SURROUND CAMERA(S) 774

INFRARED CAMERA 772

WIDE VIEW CAMERA 770

LONG-RANGE CAMERA 798

LONG-RANGE CAMERA 798

STEREO CAMERA 768

SERVER(S) 778

CPU 780(B)

PCIE SWITCH 782(D)

PCIE SWITCH 782(C)

CPU 780(A)

PCIE SWITCH 782(B)

PCIE SWITCH 782(A)

GPU 784(F)

GPU 784(H)

GPU 784(E)

GPU 784(G)

GPU 784(B)

GPU 784(D)

GPU 784(A)

GPU 784(C)

786

788

700

792

794

NETWORK(S) 790

776

900

IMAGE STITCHING WITH SACCADE-BASED CONTROL OF DYNAMIC SEAM PLACEMENT FOR SURROUND VIEW VISUALIZATION

BACKGROUND

Vehicle Surround View Systems (SVS) provide occupants of a vehicle with a visualization of the area surrounding the vehicle. Surround view systems provide drivers with the ability to view the surrounding area, including blind spots where the driver's line of sight is occluded by parts of the vehicle or other objects in the environment, without the need to reposition (e.g., turn their head, get off the driver's seat, lean a certain direction, etc.). This visualization may assist and facilitate a variety of driving maneuvers, such as smoothly entering or exiting a parking spot as the driver is more aware of vulnerable road users like pedestrians or objects such as a road curb or other vehicles. More and more vehicles, especially luxury brands or new models, are being produced with surround view systems equipped.

Existing vehicle surround view systems use fisheye cameras—typically mounted at the front, left, rear, and right sides of the vehicle body—to perceive the surrounding area in multiple directions. Additional cameras may be included in special cases, like for long trucks or vehicles with trailers. Frames from the individual cameras are stitched together using camera parameters to align frames and blending techniques to combine overlapping regions to provide a horizontal 360° surround view visualization. Due to noise or various white balance configurations, a noticeable seam may appear where two images are stitched together. Although various mitigation measures may be used to smooth out the transition of image pixel values from one image to another (e.g., assigning pixel weight proportional to its distance to the edge, multiresolution based blending, neural network based blending), a noticeable seam is often still visible in a stitched image.

One prior technique dynamically places seams according to scene content, for example, by avoiding or minimizing placing seams on top of detected objects or other salient regions. One challenge with this approach arises when scene content depicted in overlapping regions changes over time. As scene content changes, the location of dynamically placed seams may also change, leading to potential discontinuities emerging over time in resulting stitched images from one time slice to the next. These discontinuities may be distracting to an occupant or operator, and may otherwise negatively impact the viewing experience. As such, there is a need for improved stitching techniques that reduce discontinuities resulting from dynamic seam placement in successive stitched images, and/or otherwise improve the visual quality of stitched images.

SUMMARY

Embodiments of the present disclosure relate to image stitching using saccade-based dynamic seam placement. In contrast to conventional systems, such as those described above, systems and methods are disclosed that relax or remove constraints on the movement of dynamically placed seams during a detected saccade of a monitored person. Since the monitored person is effectively blind during the saccade motion and should not notice seam movement, or when a detected gaze of a monitored person (e.g., an operator or occupant of an ego-object) indicates the monitored person is looking away from a display, dynamically placing stitching seams during these times can avoid or mitigate the adverse impact to the monitored person's viewing experience that might otherwise result from discontinuities resulting from using dynamically re-positioned seams.

In some embodiments, a stitched image may be generated from overlapping image frames using a dynamic seam placement that depends on scene content and/or other factors. Since an optimally-determined seam placement may jump from a previous location from time slice to time slice, one or more constraints may be applied to limit the movement of dynamically placed seams such that any given seam moves gradually over time, limiting potential discontinuities in a visualization of the stitched image on a display. Eye tracking may be used to detect a saccade of a monitored person and/or detect that the monitored person is not looking at the display, and one or more of the constraints used to limit the movement of dynamically placed seams may be relaxed or lifted when the monitored person is experiencing a saccade and/or is looking away from the display.

BRIEF DESCRIPTION OF THE DRAWINGS

The present systems and methods for image stitching using saccade-based control of dynamic seam placement are described in detail below with reference to the attached drawing figures, wherein:

FIG. 1 is an example seam stitching system, in accordance with some embodiments of the present disclosure;

FIG. 5 is a flow diagram showing an image stitching method using an indicator representing whether a monitored person is experiencing a saccade or whether the monitored person is looking away from a display, in accordance with some embodiments of the present disclosure;

FIG. 6 is a flow diagram showing an image stitching method using an indicator of whether a display is being observed by a monitored operator or occupant of an ego-object in an environment, in accordance with some embodiments of the present disclosure;

DETAILED DESCRIPTION

Figure 2A:
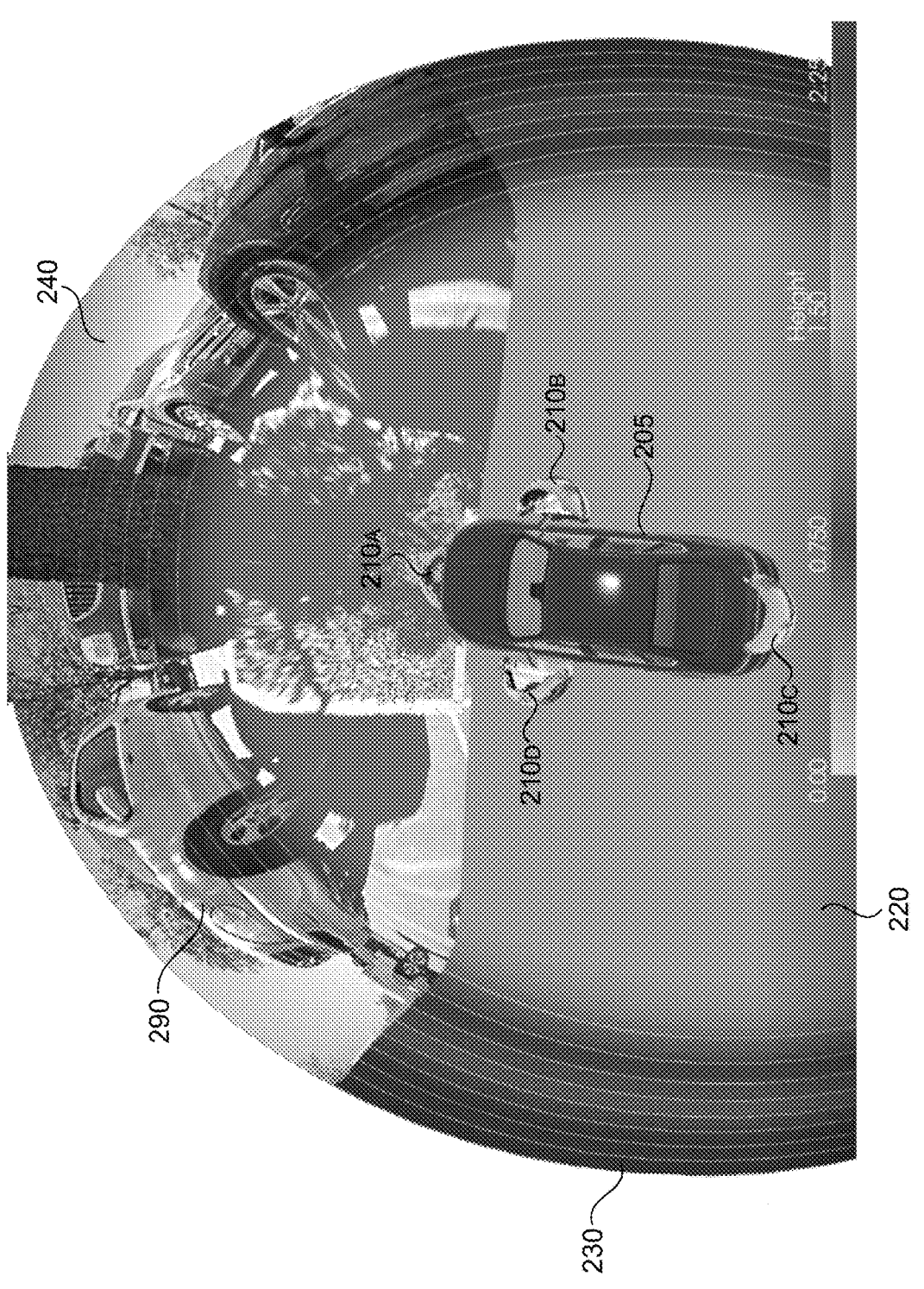
FIGS. 2A-2C are example visualizations of overlapping images of an environment around an ego-object.

Systems and methods are disclosed relating to image stitching using saccade-based dynamic seam placement. For example, systems and methods are disclosed that relax or remove constraints on the movement of dynamically placed seams during a detected saccade, or when a detected gaze of a monitored person (e.g., an operator or occupant of an ego-object) indicates the monitored person is looking away from a display. The present techniques may be used to visualize an environment around an ego-object, such as a vehicle, robot, and/or other type of object, in systems such as parking visualization systems, Surround View Systems (SVS), and/or others.

Although the present disclosure may be described with respect to an example autonomous or semi-autonomous vehicle or machine 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle or types. In addition, although the present disclosure may be described with respect to image stitching for surround view visualization, this is not intended to be limiting, and the systems and methods described herein may be used to provide one or more multi-view, composite view, and/or proximity view representations or other renderings in augmented reality, virtual reality, mixed reality, robotics, camera probes (e.g., medical or surgical probes), security and surveillance, gaming, teleconferencing, autonomous or semi-autonomous machine applications, and/or any other technology spaces where image stitching or rendering may be used (e.g., by suppressing a screen update during a detected saccade).

In some embodiments, a stitched image may be generated from overlapping image frames for each of a plurality of time slices (e.g., at a particular frame rate, such as 30 frames per second (fps)). For individual time slices, a (e.g., optimized) seam placement may be determined dynamically based on scene content in the overlapping image frames, state of an ego-object that captured the image frames (e.g., speed of ego-motion, direction of ego-motion, proximity to salient objects), active viewport direction, a salient region targeted by driver gaze, and/or other factors. A visualization of the resulting stitched image may be presented on a display visible to an operator or occupant of the ego-object. Since an optimal seam placement may jump from its previous location from time slice to time slice, one or more constraints may be applied to limit the movement of dynamically placed seams such that any given seam may move gradually over time, limiting potential temporal discontinuities in the displayed visualization, but limiting the ability to leverage an optimally determined seam placement.

However, an operator or occupant may not be able to see the display due to saccadic masking, or because the operator or occupant is not looking at the display. A saccade is a rapid eye movement that occurs when moving gaze from one point to another. A typical saccade duration may last 20-200 milliseconds, and a typical duration between saccades may be on the order of every few hundred milliseconds to seconds. The human vision system is effectively blind during saccades, a phenomenon known as saccadic masking. Human perception tends to suppress any changes in a scene that take place during a saccade, such that the conscious part of cognition receives a smooth, consistent experience, despite frequent interruptions from saccades. This effect is known as saccadic suppression of image displacement.

As such, one or more constraints used to limit movement of dynamically placed seams may be relaxed or lifted based on a determination that an operator or occupant is experiencing a saccade and/or is looking away from the display. More specifically, eye tracking (e.g., in a Driver Monitoring System (DMS)) may be used to detect a saccade and/or detect the display is not within a field of view of a gaze of a monitored operator or occupant, and generate one or more corresponding free-to-update indicator signals (e.g., a saccade indicator, an indicator that a monitored operator or occupant is not looking at a display, and/or some other indicator that the display is not being observed by a monitored operator or occupant).

The free-to-update indicator signal may be used as an input into a seam placement and stitching process and used in various ways. In some embodiments, dynamic seam updates may be suppressed (e.g., updated seam placements are not computed, image stitching uses seam placement(s) from the preceding time slice) when the signal indicates the display is not free-to-update (e.g., there is no detected saccade, a monitored operator or occupant is looking at the display). In some embodiments, dynamic seam update suppression may be disengaged (dynamic seam updates may be allowed) based on a determination that dynamic seam updates have been suppressed (e.g., a saccade has not been observed) during some duration of time (e.g., 200 milliseconds) and/or some corresponding number of time slices (e.g., corresponding to five 30 fps frames).

In some situations, an optimized dynamic seam placement may be determined independent of whether or not the free-to-update indicator signal indicates the display is free-to-update, and the free-to-update indicator signal may be used to determine whether and/or how to use the determined (e.g., optimized) dynamic seam placement. For example, the dynamic seam placement may be determined using any known technique, such as those described by the present Applicant in U.S. Provisional App. No. 63/326,724, entitled "Surround View Optimization for Autonomous Systems and Applications" and filed on Apr. 1, 2022, the contents of which are incorporated by reference in their entirety. As a baseline (e.g., when the signal indicates the display is not free-to-update, such as during the absence of a saccade), the seam placement from the preceding time slice may be retrieved, and a filter may be applied to limit the speed with which the seam can move from the preceding seam placement to the optimized dynamic seam placement. When the signal indicates the display is free-to-update (e.g., a saccade is occurring, has begun or is imminent), the filter may be relaxed (e.g., by increasing the cut-off frequency to allow faster changes) or removed (e.g., switching the low pass filter to an all-pass filter). In embodiments that use a straight seam, the seam may be parameterized as a single variable (e.g., seam angle) and a single dimensional filter may be used to control changes in the single variable. In some embodiments that use a straight seam, the seam may be parameterized using some other number of variables, such as four (e.g., representing two positional dimensions for the start point and two positional dimensions the end point of the seam), and a corresponding (e.g., four) dimensional filter may be used to control changes in the (e.g., four) variables. In some embodiments that use a non-linear seam (e.g., determined using seam carving), the seam may be parameterized using multiple variables, and a multi-dimensional filter may be used to control changes in the multiple variables. As such, a filter may be applied to limit the speed of seam movement when the signal indicates the display is not free-to-update, and when the signal indicates the display is free-to-update, the limit may be relaxed or released, permitting the seam to move much faster.

In some embodiments, two calculations may be performed in parallel—determining a dynamic seam placement and determining a gradually moving seam placement—and one of the two seam placement options may be selected based on the free-to-update indicator signal. For example, an optimized dynamic seam placement may be selected when the signal indicates the display is free-to-update (e.g., a saccade has begun or is occurring), while the gradually moved seam placement may be selected when the signal indicates the display is not free-to-update (e.g., there is no detected saccade).

In some situations, an optimized dynamic seam placement (e.g., after one or more optimization algorithms are applied) may be determined using the free-to-update indicator signal. For example, in some embodiments that use seam carving to attempt to find a non-linear path around detected objects or salient regions, dynamic programming may be used to minimize an energy function to determine an optimized path (and corresponding shape) for a seam, and the energy function may include a term that depends on the free-to-update indicator signal (e.g., the presence of a detected saccade). For example, if the signal indicates that an operator or occupant is not observing the display, the energy function may include a term that encourages similarity between consecutive seam shapes and/or positions, and/or penalizes large changes (e.g., in seam shape and/or position). If the signal indicates that an operator or occupant is observing the display (e.g., a saccade has begun or is occurring), the penalty may be relaxed or removed. As such, a seam may be placed at a determined location using a term that depends on the free-to-update indicator signal.

In some embodiments, the eye tracking process that detects when saccades occur or are about to occur—and/or when a monitored operator or occupant is not looking at a display—is synchronized with the image stitching process that generates a stitched image for each time slice. In some embodiments, image stitching may be executed at a particular frame rate (e.g., 30 fps, or approximately once every 33 milliseconds), and eye tracking may be executed at a different (e.g., faster) frame rate (e.g., 60 fps, or approximately once every 16 milliseconds). As explained herein, the image stitching process may depend on or be influenced by a free-to-update indicator signal, and some embodiments may push back a decision that uses the free-to-update indicator signal (e.g., a decision whether to move a seam fast or slow) late into the image stitching process before rendering a stitched image, effectively increasing the available time to detect and/or react (e.g., to a saccade). Some saccades are faster than others, so by increasing the available time to detect and/or react to a saccade, a stitched image may be generated for a time slice using detected eye movement from earlier in the same time slice.

In some cases, even though a free-to-update indicator signal may indicate that a monitored occupant (e.g., the operator) is in the midst of or about to have a saccade or is not looking at the display, non-monitored occupants may still be looking at the display. To avoid creating a flickering effect that may be observed by non-monitored occupants, some embodiments may limit the seam jump frequency (e.g., how frequently seams are allowed to jump). For example, once a seam jump is permitted, a subsequent seam jump may only be permitted after some buffer time has elapsed (e.g., 1 second, 10 seconds). In some embodiments, the limit on seam jump frequency may be applied based on other occupants besides an operator being detected in the vehicle (using any known technique).

As such, the techniques described herein may be used to dynamically place seams that avoid or minimize crossing salient objects or regions (such as emergency vehicles, road users, and moving objects), gradually move seams when a monitored operator or occupant is looking at a display, and enable optimized dynamic seam updates by relaxing or removing movement constraints when a monitored operator or occupant is saccading or looking away from the display. As such, optimized dynamic seam updates may occur without the monitored operator or occupant noticing potentially distracting seam changes. In embodiments that enable seam jumps during detected saccades, some or all seam jumps may occur before a detected saccade ends (e.g., while the monitored operator or occupant is effectively blind), so the monitored operator or occupant should not notice most or any seam updates on the display. Generally, controlling dynamic seam updates using detected saccades and/or detected events during which a monitored operator or occupant is not looking at the display can reduce observed discontinuities resulting from dynamic seam placement in successive stitched images. As such, the techniques described herein may be used to reduce observed stitching artifacts, improve visual representations of useful information in a stitched image, improve visual quality of stitched images, and promote safe operation of the vehicle or machine.

With reference to FIG. 1, FIG. 1 is an example seam stitching system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

In the example illustrated in FIG. 1, the seam stitching system 100 includes an eye tracker 110, a seam stitching module 140, and a visualization component 190. In some embodiments, the visualization component 190 controls, triggers, or otherwise causes presentation of a visualization of stitched images (e.g., rendered at a particular frame rate) on a display that is visible to a person whose face and/or eyes are monitored by the eye tracker 110. In some embodiments, the stitched image includes a representation of an environment around an ego-vehicle; the display is visible to an operator or occupant of the ego-vehicle and includes one or more control-bearing surfaces, touch screen interfaces, in-vehicle infotainment (IVI), in-car entertainment (ICE), and/or other display features; and the operator and/or occupant are monitored by the eye tracker 110. Depending on the embodiment, the eye tracker 110 may include a saccade detector 120 that detects when a monitored person is saccading, and/or the eye tracker 110 may include a gaze-off-display detector 130 that that detects when the display is not within a monitored person's field of view. In such a case, the eye tracker 110 may generate one or more corresponding free-to-update indicator signals (e.g., a saccade indicator, an indicator that a monitored operator or occupant is not looking at a display, and/or some other indicator that the display is not being observed by a monitored operator or occupant), and provide the free-to-update indicator signal(s) to the seam stitching module 140.

Continuing with a high level overview, the seam stitching module 140 may generate a stitched image using a dynamic seam placement determined based at least in part on the free-to-update indicator signal(s). In the embodiment illustrated in FIG. 1, the seam stitching module 140 includes an alignment component 150, a dynamic seam placement component 160, and a blending component 180. At a high level, the alignment component 150 may receive frames of image data (e.g., images) representing overlapping views of an environment, and use corresponding sensor (e.g., camera) calibration parameters to align the frames and create an aligned composite image (e.g., a panorama, a 360° image) or surface (e.g., bowl shaped surface) with regions of overlapping image data. The dynamic seam placement component 160 may determine where in each overlapping region to place a seam (e.g., avoiding or minimizing crossing salient objects or regions) using the free-to-update indicator signal(s), and the blending component 180 may use any known blending technique to blend the overlapping image data at each seam to create a stitched image or surface (e.g., a stitched panorama, stitched 360° image, stitched textured surface).

As such, the visualization component 190 may cause presentation of a visualization of the stitched image or surface on the display. In some embodiments, the seam stitching module 140 may generate a stitched image, such as a 360° ("surround view") visualization of the environment surrounding an ego-object (e.g., a vehicle), and the visualization component 190 may render a view of the surround view visualization. The surround view visualization of the environment may take the form of a stitched panorama, a stitched 360° image, a top-down projection of a stitched 360° image, a textured three-dimensional (3D) geometric surface modeling the surrounding environment in the shape of a 3D bowl, a rendering of one of the foregoing, and/or other forms. For example, stitched image data may be mapped onto a textured 3D surface in a 3D representation of the environment; a virtual camera may be placed in the 3D environment with a specified location and/or orientation and used to render a view of the textured 3D surface from the perspective of the virtual camera into a viewport; and/or the rendered view may be presented on a display visible to occupants (e.g., a driver) of the vehicle.

Returning now to the eye tracker 110, in some embodiments, the eye tracker 110 generates an indicator signal representing whether a monitored person is experiencing a saccade and/or whether a monitored person is looking away from a display, using sensor data generated from one or more sensors (e.g., cameras). In some embodiments in which the monitored person is an operator or occupant in a cabin or cockpit, the one or more sensors may include any number of in-cabin sensors with a sensory field or field of view at least partially internal to the cabin or cockpit, such as one or more in-cabin cameras, in-cabin near-infrared (NIR) sensors, in-cabin microphones, one or more sensors of a driver monitoring system, and/or the like. In some embodiments in which the monitored person is playing a game on the display, participating in a teleconference, or wearing an augmented, mixed, or virtual reality device, the one or more sensors may include any number of web-cams, cell phone cameras, gaming cameras, cameras incorporated into an augmented or virtual reality device headset, NIR sensors, and/or the like.

In some embodiments, the eye tracker 106 (e.g., the saccade detector 120 and/or the gaze-off-display detector 130) may be part of a monitoring system (e.g., a driver monitoring system) that uses the sensor data to determine gestures, postures, activities, and/or eye movements (e.g., saccades, saccade velocity, gaze locations, directions, or vectors, pupil size, blink rate, etc.) of a monitored person (e.g., an operator or occupant of an ego-object, such as the vehicle 700 of FIGS. 7A-7D). Generally, any known eye tracking technique may be used at any suitable frequency to detect a saccade and/or to detect whether a monitored person is looking away from a display. For example, the eye tracker 106 may use sensor data (e.g., sensor data from one or more in-cabin cameras, Near-Infrared (NTR) cameras or sensors, and/or other eye-tracking sensor types) to determine saccade information (e.g., occurrence, velocity, direction, etc.), gaze directions and movements, and/or other information. The eye tracker 106 may monitor or analyze each eye individually, and/or may monitor or analyze both eyes together. For example, both eyes may be monitored in order to use triangulation for measuring a depth of an occupant's gaze. In some embodiments, the eye tracker 106 may execute one or more machine learning algorithms, deep neural networks, computer vison algorithms, image processing algorithms, mathematical algorithms, and/or the like to determine the eye tracking information. In some non-limiting embodiments, the eye tracker 106 may include features, functionality, and/or components described in U.S. Non-Provisional application Ser. No. 17/076,690, filed on Oct. 21, 2020, U.S. Non-Provisional application Ser. No. 17/076,690, filed on Oct. 21, 2020, U.S. Non-Provisional application Ser. No. 16/363,648, filed on Oct. 8, 2018, U.S. Non-Provisional application Ser. No. 16/544,442, filed on Aug. 19, 2019, U.S. Non-Provisional application Ser. No. 17/010,205, filed on Sep. 2, 2020, U.S. Non-Provisional application Ser. No. 16/859,741, filed on Apr. 27, 2020, U.S. Non-Provisional application Ser. No. 17/004,252, filed on Aug. 27, 2020, and/or U.S. Non-Provisional application Ser. No. 17/005, 914, filed on Aug. 28, 2020, the contents of each of which are incorporated by reference in their entirety.

For example, with respect to saccade detection, infrared light may be used to illuminate the face of a monitored person, and an infrared camera may be used to capture image frames, track eye movement, and detect rapid eye motion (a saccade) from one frame to the next. A typical saccade lasts from 20-200 milliseconds, and the time it takes to detect a saccade may depend on the frame rate of the camera and the processing power of the processor used for eye tracking. Given stabile eye tracking, a saccade may be detected based on the difference in eye movement from one frame to the next. As a result, a camera running at 30 fps, for example, may be used to detect a saccade in approximately 33 milliseconds (which should catch almost all saccades during which they occur); a camera running at 60 fps may be used to detect a saccade in approximately 16 milliseconds, and so on. Depending on the implementation, the saccade detector 120 may generate any suitable indicator signal representing whether or not a saccade has been detected (e.g., a binary flag indicating whether or not a saccade is detected, a flag indicating a saccade has begun, is occurring, and/or has ended, etc.).

With respect to detecting whether or not a monitored person is looking at a display, the gaze-off-display detector 130 may use eye tracking to detect gaze direction, project a corresponding gaze target and/or field of view onto a two-dimensional (2D) or three-dimensional (3D) representation of the environment, and compare the projected gaze target and/or field of view with a known location of a display within the representation of the environment to determine whether or not the gaze is targeting the display and/or whether the display is within the field of view of the monitored person's gaze. Depending on the implementation, the gaze-off-display detector 130 may generate any suitable indicator signal representing whether or not a monitored person is looking away from a display (e.g., a binary flag, a flag indicating the monitored person has begun looking at the display, is looking at the display, and/or has stopped looking at the display, etc.).

As such, the eye tracker 110 (e.g., the saccade detector 120, the gaze-off-display detected 130) may generate one or more free-to-update indicator signals (e.g., a saccade indicator, an indicator that a monitored operator or occupant is not looking at a display, and/or some other indicator that the display is not being observed by a monitored operator or occupant), and provide the free-to-update indicator signal(s) to the seam stitching module 140. The seam stitching module 140 may use the free-to-update indicator signal(s) to determine whether and/or how to use a dynamic seam placement (e.g., based on scene content in the image frames being stitched, state of an ego-object that captured the image frames, active viewport direction, a salient region targeted by driver gaze) to generate a stitched image.

More specifically, the seam stitching module 140 may operate at a designated frequency or frame rate, generating a stitched image (a stitched output frame) from overlapping image frames for each of a plurality of time slices (e.g., at a particular frame rate, such as 30 fps). In some embodiments, the image frames are generated using one or more sensors of an ego-object, such as one or more of the stereo camera(s) 768, wide-view camera(s) 770 (e.g., fisheye cameras), infrared camera(s) 772, surround camera(s) 774 (e.g., 360° cameras), and/or long-range and/or mid-range camera(s) 798 of the vehicle 700 of FIG. 7A. Typically, different sensors have their own 3D coordinate systems. As such, in some embodiments, the alignment component 150 of the seam stitching module 140 may receive a set of image frames captured during a particular time slice, and use corresponding sensor (e.g., camera) calibration parameters to align the image frames (e.g., in a coordinate system defined relative to the ego-object, such as a vehicle rig coordinate system, in a global 3D coordinate system or world space), creating an aligned composite image (e.g., a panorama, a 360° image, a top-down projection image) or surface (e.g., bowl shaped surface) with regions of overlapping image data.

The dynamic seam placement component 160 of the seam stitching module 140 may use the free-to-update indicator signal(s) to determine whether and/or how to use a dynamic seam placement to identify a location for a seam in the region of overlapping image data for each pair of overlapping image frames. More specifically, the dynamic seam placement component 160 may include a control component 170 that selects or triggers different types of seam placement code or algorithms (e.g., executed by dynamic seam placement component 160 or some other component) depending on the state represented by the free-to-update indicator signal(s) (e.g., depending on whether a detected saccade is occurring and/or whether the monitored person is looking away from the display). As such, depending on the implementation, the dynamic seam placement component 160 may determine a seam placement in various ways that may depend on the free-to-update indicator signal.

For example, in some embodiments, the dynamic seam placement component 160 may determine to suppress dynamic seam updates (e.g., by determining to use seam placement(s) from the preceding time slice, determining not to compute updated seam placement(s) from the preceding time slice) when the free-to-update indicator signal indicates the display is not free-to-update (e.g., there is no detected saccade, a monitored operator or occupant is looking at the display). In some embodiments, the dynamic seam placement component 160 may disengage dynamic seam update suppression (e.g., permit dynamic seam updates) based on a determination that dynamic seam updates have been suppressed (e.g., a saccade has not been observed) during some duration of time (e.g., 200 milliseconds) and/or some corresponding number of time slices (e.g., corresponding to six frames at 30 fps).

In some embodiments, the dynamic seam placement component 160 may determine an optimized dynamic seam placement independent of whether or not the free-to-update indicator signal indicates the display is free-to-update, and the free-to-update indicator signal may be used to determine whether and/or how to use the optimized dynamic seam placement. Generally, the dynamic seam placement component 160 may determine an optimized dynamic seam placement using any known technique, such as those described by the present Applicant in U.S. Provisional App. No. 63/326, 724 (e.g., using object detection, projecting object and/or saliency masks onto the aligned composite image or surface, positioning seams in regions of overlapping image data to avoid or minimize crossing salient pixels represented in the projected masks). In some embodiments, when the signal indicates the display is not free-to-update, such as during the absence of a saccade), the dynamic seam placement component 160 may retrieve a seam placement from the preceding time slice and apply a filter to limit the speed with which the seam can move from the preceding seam placement to the optimized dynamic seam placement determined for the current time slice. By contrast, when the signal indicates the display is free-to-update (e.g., a saccade has begun or is occurring), the dynamic seam placement component 160 may relax the filter (e.g., by increasing the cut-off frequency to allow faster changes) or remove the filter (e.g., switching the low pass filter to an all-pass filter).

In some embodiments that use a straight seam, the seam may be parameterized as a single variable (e.g., seam angle) and the dynamic seam placement component 160 may use a single dimensional filter to control changes in the single variable. In some embodiments that use a straight seam, the seam may be parameterized using some other number of variables, such as four (e.g., representing two positional dimensions for the start point and two positional dimensions the end point of the seam), and the dynamic seam placement component 160 may use a corresponding (e.g., four) dimensional filter to control changes in the (e.g., four) variables. In some embodiments that use a non-linear seam (e.g., determined using seam carving), the seam may be parameterized using multiple variables, and the dynamic seam placement component 160 may use a multi-dimensional filter to control changes in the multiple variables. As such, the dynamic seam placement component 160 may apply a filter to limit the speed of seam movement from time slice to time slice when the signal indicates the display is not free-to-update, and the dynamic seam placement component 160 may relax or release the filter when the signal indicates the display is free-to-update, permitting the seam to move faster.

In some embodiments, the dynamic seam placement component 160 may determine an optimized dynamic seam placement using a term that depends on the free-to-update indicator signal. For example, in some embodiments that use seam carving to attempt to find a non-linear path around detected objects or salient regions (e.g. represented in corresponding overlapping object and/or saliency masks), the dynamic seam placement component 160 may use dynamic programming to minimize an energy function to determine the optimized path (and corresponding shape) for a seam, and the energy function may include a term that depends on the free-to-update indicator signal (e.g., the presence of a detected saccade). For example, if the signal indicates that an operator or occupant is observing the display, the energy function may include a term that encourages similarity between consecutive seam shapes and/or positions, and/or penalizes large changes (e.g., in seam shape and/or position). If the signal indicates that an operator or occupant is observing the display (e.g., a saccade has begun or is occurring), the penalty may be relaxed or removed. As such, the dynamic seam placement component 160 may place a seam at a determined location (e.g., based on an output of one or more optimization algorithms) using a term that depends on the free-to-update indicator signal.

In some embodiments, in order to push back a decision that uses the free-to-update indicator signal (e.g., a decision whether to move a seam fast or slow) late into the image stitching process before rendering a stitched image, the dynamic seam placement component 160 may execute two calculations in parallel—determining an optimized dynamic seam placement and determining a gradually moved seam placement—and the dynamic seam placement component 160 may select one of the two seam placement options based on the free-to-update indicator signal. For example, the dynamic seam placement component 160 may select the optimized dynamic seam placement when the signal indicates the display is free-to-update (e.g., a saccade has begun or is occurring), and the dynamic seam placement component 160 may select the gradually moved seam placement when the signal indicates the display is not free-to-update (e.g., there is no detected saccade).

In some embodiments, the dynamic seam placement component 160 may limit the seam jump frequency (e.g., how frequently seams are allowed to jump). For example, once a seam jump (e.g., use of an optimized dynamic seam placement instead of a gradually moved seam placement) is permitted, the dynamic seam placement component 160 may suppress subsequent seam jumps until some buffer time has elapsed (e.g., 1 second, 10 seconds). In some embodiments, the dynamic seam placement component 160 may apply a limit on seam jump frequency when one or more other occupants besides an operator are detected in the vehicle (using any known technique), and determine not to apply the limit when the only occupant is the operator (e.g., the driver).

As such, the dynamic seam placement component 160 may determine a dynamic seam placement (e.g., an optimally determined dynamic seam placement or a filtered dynamic seam placement) or determine to use a seam placement from a preceding time slice. The blending component 180 may use any known blending technique to blend the overlapping image data at each seam to create a stitched image or surface (e.g., a stitched panorama, stitched 360° image, stitched textured surface), and the visualization component 190 may cause presentation of a visualization of the stitched image or surface on the display.

Figure 2B:
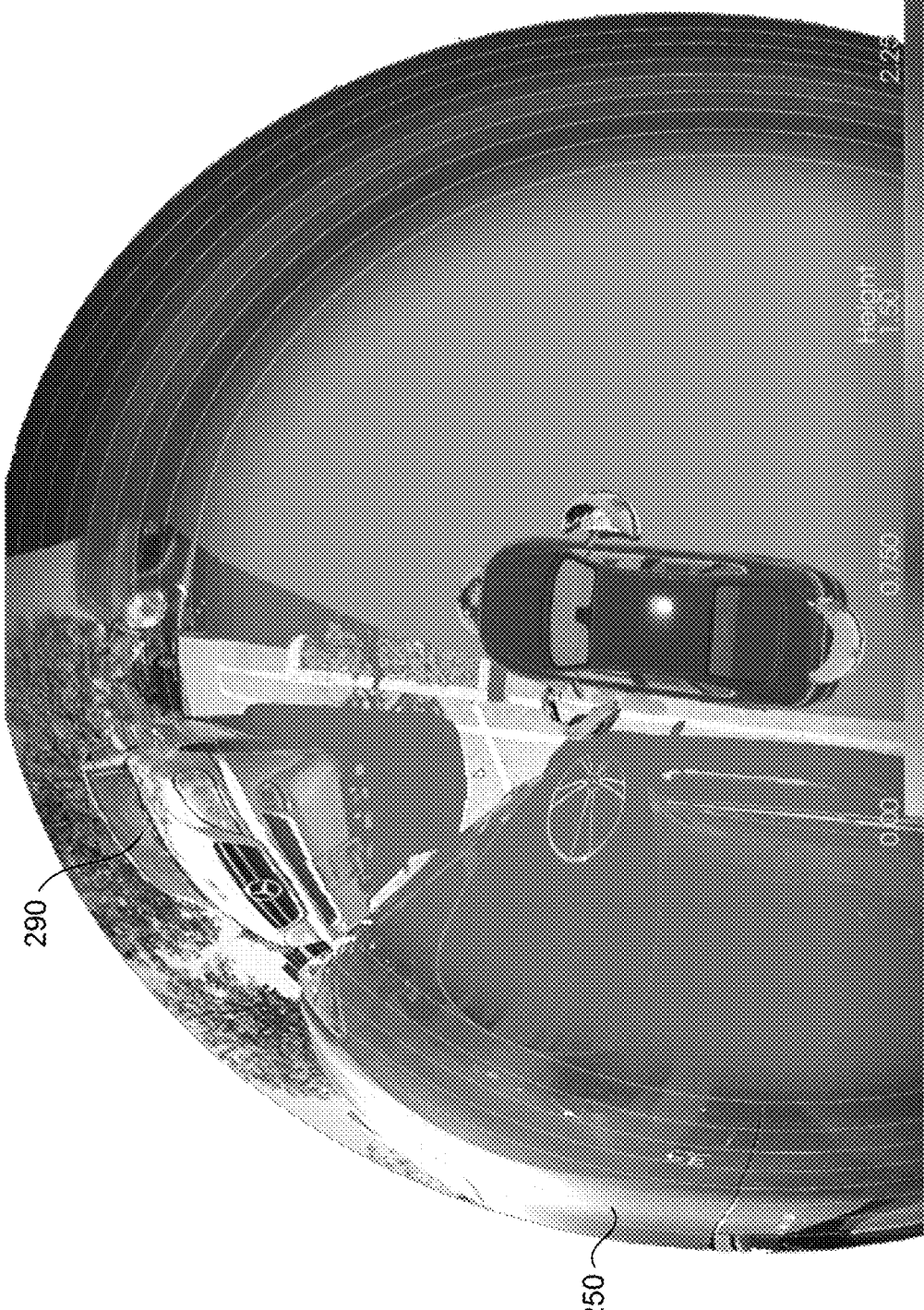
Figure 2C:
Figure 3A:
FIG. 3A-3B illustrate examples of dynamically placed seams that may be used to stitch the overlapping images shown in FIGS. 2A-2C, in accordance with some embodiments of the present disclosure.
Figure 3B:

FIGS. 2A-2C are example visualizations of overlapping images of an environment around an ego-object, and FIG. 3A-3B illustrate examples of dynamically placed seams that may be used to stitch the overlapping images shown in FIGS. 2A-2C, in accordance with some embodiments of the present disclosure. FIGS. 2A-2C illustrate a scenario in which a vehicle 205 with four fisheye cameras installed at the front, left, rear, and right side drives through an environment, continuously (e.g., at a frame rate) capturing surrounding videos with the four fisheye cameras. In some embodiments, the surrounding environment may be modeled as a 3D surface, such as a 3D bowl comprising a circular ground plane for the inner portion of the bowl (e.g., inner bowl 220 of FIG. 2A) connected to an outer bowl (e.g., outer bowl 230 of FIG. 2A) represented as a curved surface rising from the ground plane to a height or a slope that increases proportionally to the distance from the bowl center.

In some embodiments, the four fisheye images captured during a particular time slice are projected onto corresponding portions of the 3D bowl. In FIG. 2A, the four fisheye projection images 210a-d are visualized as miniature bowl projections at locations corresponding to where the four fisheye cameras are installed on the vehicle 210. FIG. 2A illustrates the bowl projection 240 of the front fisheye image onto the inner and outer bowl 220 and 230, FIG. 2B illustrates the bowl projection 250 of the left fisheye image onto the inner and outer bowl 220 and 230, and FIG. 2C illustrates the bowl projections 240 and 250 of the front and left fisheye images overlapping on the inner and outer bowl 220 and 230. Notice that in FIG. 2A, the bowl projection 240 of the front fisheye image has a different view of a nearby vehicle 290 than in the bowl projection 250 of the left fisheye image in FIG. 2B. As a result, the imaging of the vehicle 290 does not align well in the overlapping bowl projections 240 and 250 in FIG. 2C, and a seam placement that crosses the vehicle 290 would result in a stitching artifact (e.g., ghosting).

As such, FIG. 3A illustrates example dynamic seam placements 310 and 320 for a linear seam that avoids crossing the vehicle 290 of FIG. 3C. Since the scene content captured in the image frames may change over time, seam placement 310 may be determined to be an optimized placement during one time slice, while seam placement 320 may be determined to be an optimized placement during the next time slice. FIG. 3B illustrates example dynamic seam placements 330 and 340 for a nonlinear seam that avoids crossing the vehicle 290 of FIG. 3C. Seam placement 330 may be determined to be an optimized placement during one time slice, while seam placement 340 may be determined to be an optimized placement during the next time slice. These examples illustrate a scenario in which an optimized dynamic seam placement may jump from one time slice to the next (e.g., from seam placement 310 to seam placement 320 in FIG. 3A, or from seam placement 330 to seam placement 340 in FIG. 3B). As such, some embodiments may permit such seam jumps in certain circumstances (e.g., when a monitored person is saccading and/or looking away from a display); and/or may suppress seam movement or apply a filter to impose gradual seam movement and limit the speed of seam movement from a previous seam placement toward an optimal seam placement in other circumstances (e.g., when a monitored person is looking at the display and/or not saccading).

Figure 4:
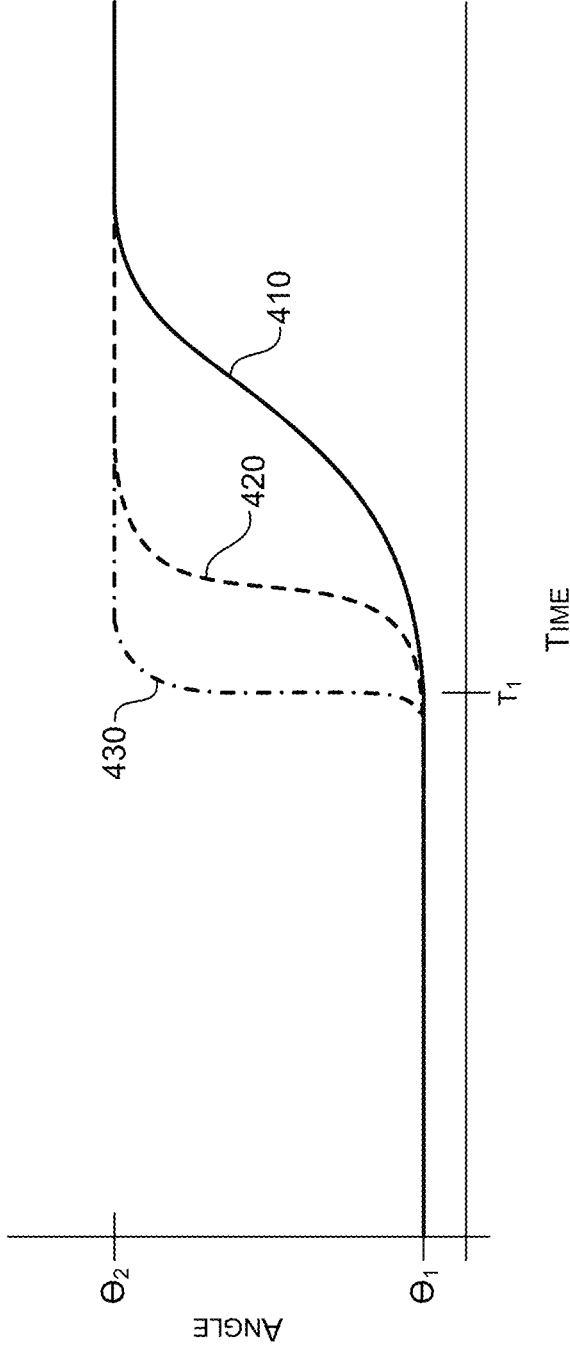
FIG. 4 is a diagram illustrating an example filter step response for an example seam filter, in accordance with some embodiments of the present disclosure.

FIG. 4 is a diagram illustrating an example filter step response for an example seam filter, in accordance with some embodiments of the present disclosure. The filter response in FIG. 4 is represented as a graph of seam angle vs. time and in which the seam angle is initially at $\theta_1$. At time $t_1$, a new optimized dynamic seam placement would place the seam at seam angle $\theta_2$. When a monitored person is looking at the display and/or not saccading, in order to limit seam jumps (which can manifest as noticeable discontinuities in the resulting visualization), a filter may be applied (e.g., using response curve 410) to limit the speed of seam movement. On the other hand, when the monitored person is looking away from the display and/or saccading (e.g., moving his or her eyes from one part of the display to another, or to and from the display), the filter may be relaxed (e.g., using response curve 420) or removed (e.g., using step response curve 430) to permit faster seam movements and/or jumps.

Now referring to FIGS. 5 and 6, each block of methods 500 and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 500 and 600 may be understood, by way of example, with respect to the example seam stitching system 100 of FIG. 1. However, these methods may additionally or alternatively be executed by any one system, or any combination of systems, including, but not limited to, those described herein.

FIG. 5 is a flow diagram showing an image stitching method 500 using an indicator representing whether a monitored person is experiencing a saccade or whether the monitored person is looking away from a display, in accordance with some embodiments of the present disclosure. The method 500, at block B502, includes generating, based at least on eye tracking, an indicator representing whether a monitored person is experiencing a saccade or whether the monitored person is looking away from a display. For example, with respect to FIG. 1, the eye tracker 110 may include a saccade detector 120 that detects when a monitored person is saccading, and/or the eye tracker 110 may include a gaze-off-display detector 130 that detects when the display is not within a monitored person's field of view. In such a case, the eye tracker 110 may generate one or more corresponding free-to-update indicator signals (e.g., a saccade indicator, an indicator that a monitored operator or occupant is not looking at a display, and/or some other indicator that the display is not being observed by a monitored operator or occupant), and provide the free-to-update indicator signal(s) to the seam stitching module 140.

The method 500, at block B504, includes determining, based at least on the indicator, a dynamic seam placement for a seam in an overlapping region of two or more aligned image frames. For example, with respect to FIG. 1, the alignment component 150 may receive frames of image data (e.g., images) representing overlapping views of an environment, and use corresponding sensor (e.g., camera) calibration parameters to align the frames and create an aligned composite image (e.g., a panorama, a 360° image) or surface (e.g., bowl shaped surface) with regions of overlapping image data. The dynamic seam placement component 160 may determine where in each overlapping region to place a seam (e.g., avoiding or minimizing crossing salient objects or regions) using the free-to-update indicator signal(s). For example, the control component 170 may select or trigger different types of seam placement algorithms depending on different states represented by the free-to-update indicator signal(s) (e.g., depending on whether a detected saccade is occurring and/or whether the monitored person is looking away from the display).

The method 500, at block B506, includes generating a visualization composite image frame based at least on stitching image data of the two or more aligned image frames using the dynamic seam placement for the seam. For example, with respect to FIG. 1, the blending component 180 may use any known blending technique to blend overlapping image data at each seam to create a stitched image or surface (e.g., a stitched panorama, stitched 360° image, stitched textured surface).

The method 500, at block B508, includes causing the display to present a representation of the visualization composite image frame. For example, with respect to FIG. 1, the visualization component 190 may render a view of a stitched image or surface, such a 360° (or surround view) visualization of the environment surrounding an ego-object (e.g., a vehicle). The surround view visualization of the environment may take the form of a stitched panorama, a stitched 360° image, a top-down projection of a stitched 360° image, a textured 3D geometric surface modeling the surrounding environment in the shape of a 3D bowl, a rendering of one of the foregoing, and/or other forms. For example, stitched image data may be mapped onto a textured 3D surface in a 3D representation of the environment; a virtual camera may be placed in the 3D environment with a specified location and/or orientation and used to render a view of the textured 3D surface from the perspective of the virtual camera into a viewport; and/or the rendered view may be presented on a display visible to occupants (e.g., driver) of the vehicle.

Now referring to FIG. 6, FIG. 6 is a flow diagram showing an image stitching method 600 using an indicator of whether a display is being observed by a monitored operator or occupant of an ego-object in an environment, in accordance with some embodiments of the present disclosure. The method 600, at block B602, includes generating, using eye tracking, an indicator of whether a display is being observed by a monitored operator or occupant of an ego-object in an environment. For example, with respect to FIG. 1, the eye tracker 110 may generate one or more free-to-update indicator signals (e.g., a saccade indicator, an indicator that a monitored operator or occupant is not looking at a display, and/or some other indicator that the display is not being observed by a monitored operator or occupant), and provide the free-to-update indicator signal(s) to the seam stitching module 140.

The method 600, at block B604, includes determining, based at least on the indicator, a dynamic seam placement for a seam in an overlapping region of two or more aligned image frames representing overlapping views of the environment. For example, with respect to FIG. 1, the alignment component 150 may align frames of image data (e.g., images) representing overlapping views of an environment, and the dynamic seam placement component 160 may determine where in each overlapping region to place a seam (e.g., avoiding or minimizing crossing salient objects or regions) using the free-to-update indicator signal(s).

The method 600, at block B606, includes generating a composite image frame based at least on stitching image data of the two or more aligned image frames using the dynamic seam placement for the seam. For example, with respect to FIG. 1, the blending component 180 may use any known blending technique to blend overlapping image data at each seam to create a stitched image or surface (e.g., a stitched panorama, stitched 360° image, stitched textured surface).

The method 600, at block B608, includes causing the display to present a representation of the composite image frame. For example, with respect to FIG. 1, the visualization component 190 may render a view of a stitched image or surface, such a 360° (or surround view) visualization of the environment surrounding an ego-object (e.g., a vehicle).

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 7A:
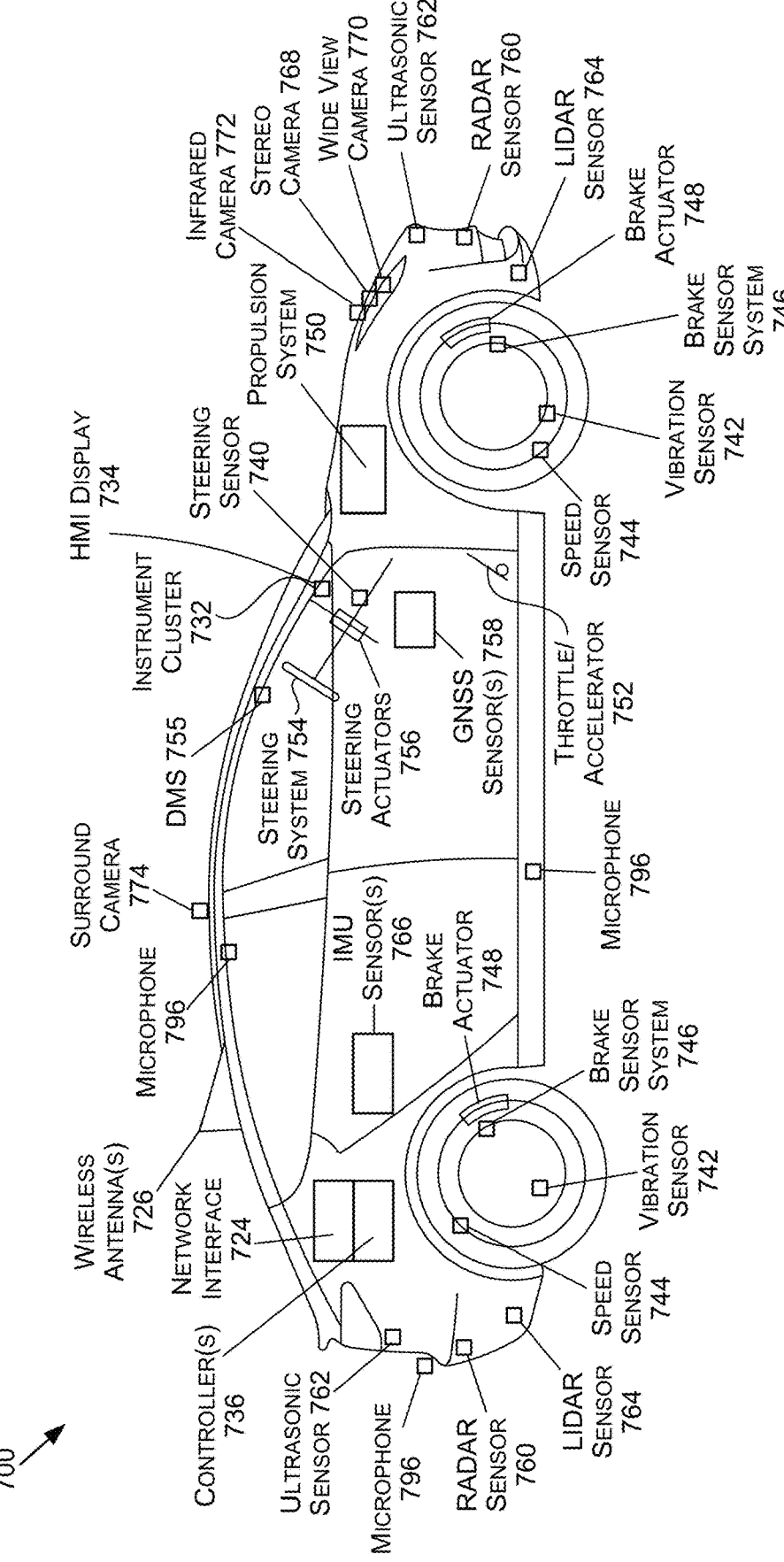
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360° cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), camera(s) of a driver monitoring system ("DMS") 755, and/or other sensor types. The sensor data (e.g., image frames from cameras with overlapping fields of view) may be stitched together using techniques described here.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 fps, 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wideview camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360° camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
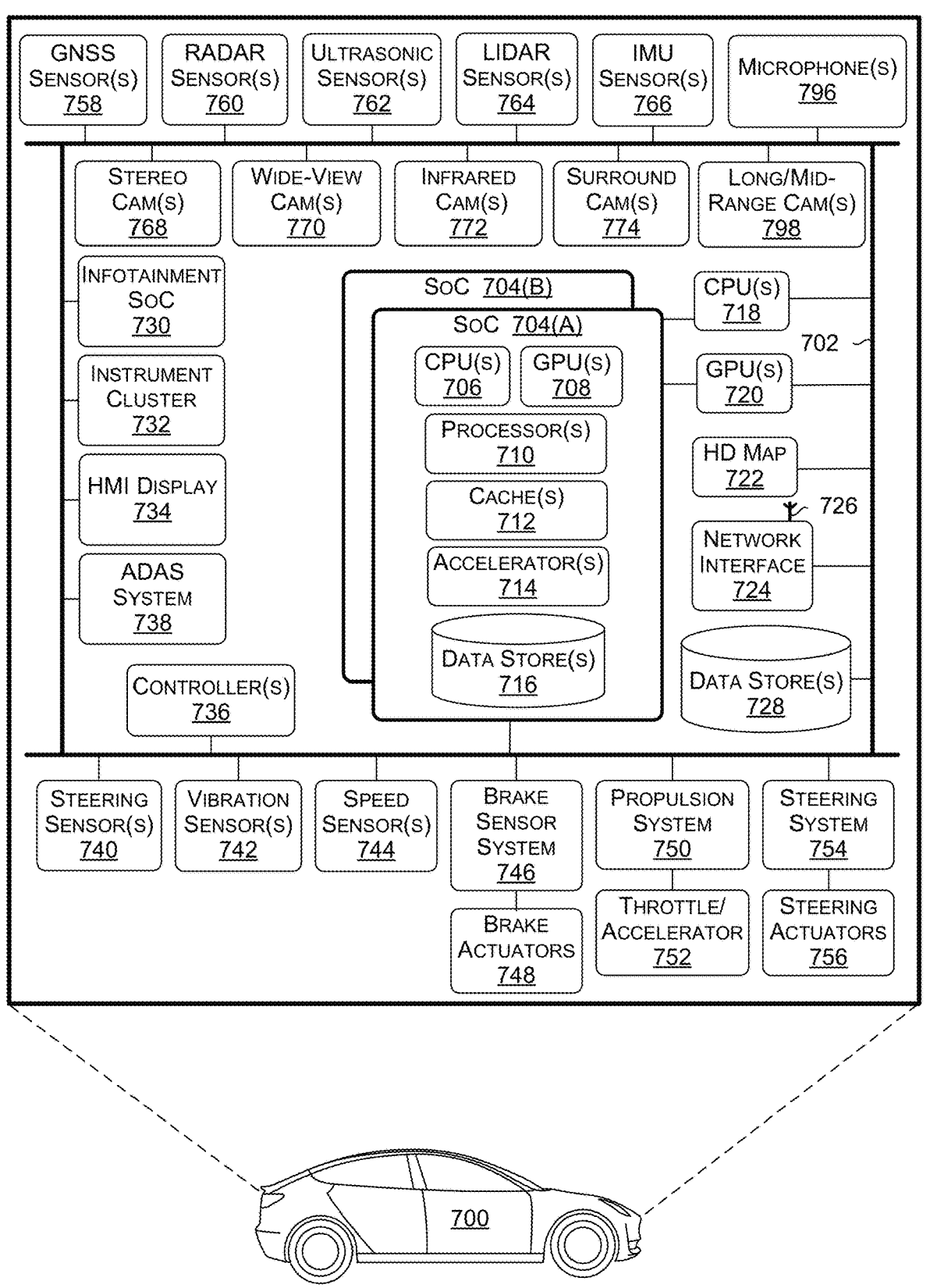
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR CORES for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's info-tainment system and settings, or provide voice-activated web surfing. Certain functions are available to the driver only when the vehicle is operating in an autonomous mode, and are disabled otherwise.

The video image compositor may include enhanced tem-poral noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image com-positor may be used to offload the GPU(s) 708 to improve performance and responsiveness.

The SoC(s) 704 may further include a mobile industry processor interface (MIPI) camera serial interface for receiv-ing video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with periph-erals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass stor-age controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety archi-tecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and function-ality that cannot be achieved by conventional systems. For example, computer vision algorithms may be executed on CPUs, which may be configured using high-level program-ming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration clus-ter, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Com-plex) that when flashing lights are detected, icy conditions exist. The flashing light may be identified by operating a third deployed neural network over multiple frames, inform-ing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detec-tion and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360° field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
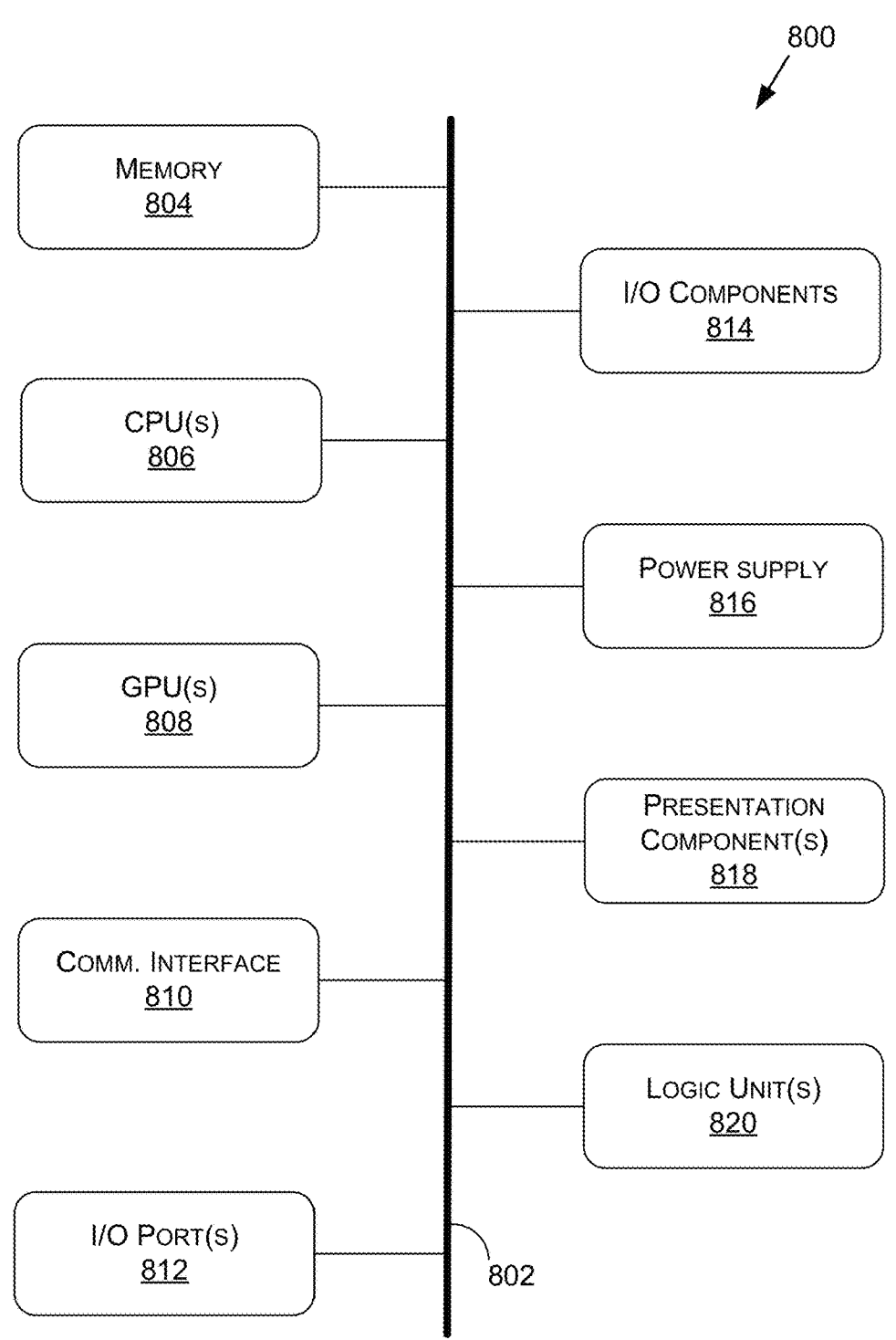
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

The techniques disclosed herein may be incorporated in any processor that may be used for processing a neural network, such as, for example, a central processing unit (CPU), a GPU, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world.

Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Example Data Center

Figure 9:
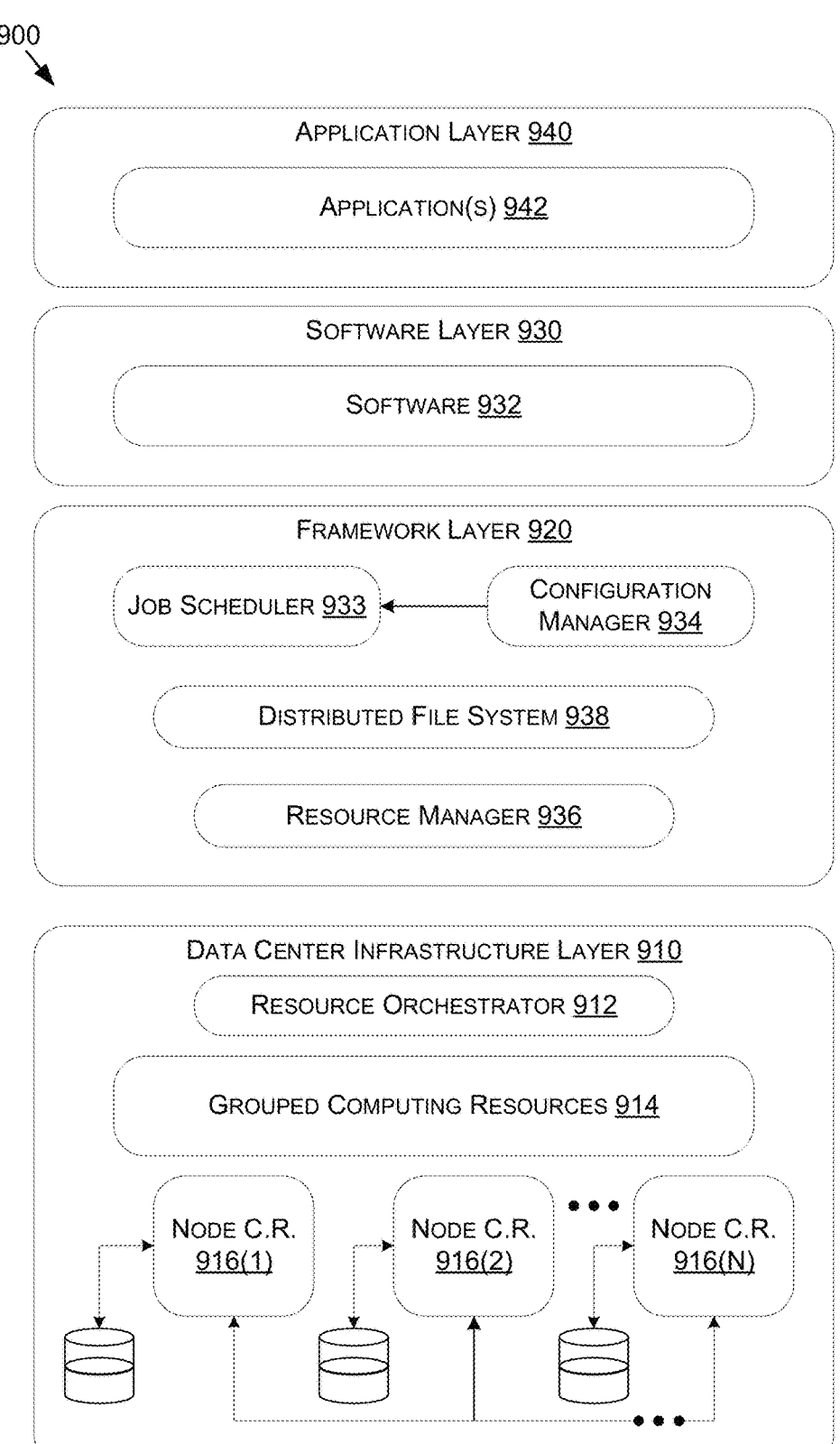
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

generating, using eye tracking information corresponding to an occupant of a machine, an indicator representing whether at least one of the occupant is experiencing a saccade or the occupant is looking away from a display;

determining, using a seam placement algorithm triggered based at least on a state of the indicator, a dynamic seam placement for a seam in an overlapping region of two or more image frames;

generating a composite image frame based at least on stitching image data of the two or more image frames using the dynamic seam placement; and causing a presentation, using the display, of a representation of the composite image frame.

2. The method of claim 1, further comprising determining to suppress an update to the dynamic seam placement in a subsequent time slice based at least on the state of the indicator representing that at least one of the occupant is not experiencing the saccade or that the occupant is looking at the display.

3. The method of claim 1, further comprising determining to update a preceding dynamic seam placement for a preceding time slice with the dynamic seam placement for a current time slice based at least on the state of the indicator representing that at least one of the occupant is experiencing the saccade or that the occupant is looking away from the display.

4. The method of claim 1, wherein the determining of the dynamic seam placement comprises, based at least on the state of the indicator representing that at least one of the occupant is not experiencing the saccade or that the occupant is looking at the display, applying a filter that limits speed of movement of the seam from a preceding dynamic seam placement for a preceding time slice to an updated dynamic seam placement for a current time slice.

5. The method of claim 1, wherein the determining of the dynamic seam placement comprises, based at least on the state of the indicator representing that at least one of the occupant is experiencing the saccade or that the occupant is looking away from the display, adjusting a filter that limits a rate of movement of the seam from a preceding dynamic seam placement for a preceding time slice to an updated dynamic seam placement for a current time slice.

6. The method of claim 1, wherein the determining of the dynamic seam placement comprises computing an optimized seam placement and a gradually moved seam placement, and determining to use the optimized seam placement as the dynamic seam placement based at least on the state of the indicator representing that at least one of the occupant is experiencing the saccade or that the occupant is looking away from the display.

7. The method of claim 1, wherein the determining of the dynamic seam placement comprises determining a non-linear path for the seam using seam carving based at least on an energy function that includes a term having a value that depends on the state of the indicator.

8. The method of claim 1, further comprising executing one or more eye tracking algorithms that generate the eye tracking information and an image stitching process that determines the dynamic seam placement using the seam placement algorithm and generates the composite image frame at corresponding synchronized frame rates.

9. The method of claim 1, wherein the generating of the composite image frame is based at least on eye movement detected based at least on eye tracking information corresponding to an earlier point in time in a same time slice.

10. The method of claim 1, wherein the method is performed by at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a virtual or augmented reality system;

a gaming system;

a teleconferencing system;

a system for performing conversational AI operations;

a system for generating synthetic data;

a system incorporating one or more virtual machines (VMs);

a system implemented at least partially in a data center; or a system implemented at least partially using cloud computing resources.

11. A processor comprising:

one or more processing units to:

generate an indicator representing whether a monitored person is at least one of experiencing a saccade or looking away from a display;

execute, based at least on the indicator, a determination of whether to relax or remove one or more constraints on movement of a dynamic seam placement for a stitching seam;

determine, based at least on the determination, the dynamic seam placement for the stitching seam in an overlapping region of two or more image frames; and cause a presentation on the display of a representation of a stitched image using the dynamic seam placement for the stitching seam.

12. The processor of claim 11, the one or more processing units further to determine to suppress an update to the dynamic seam placement in a subsequent time slice based at least on the indicator representing at least one of that the monitored person is not experiencing the saccade or that the monitored person is looking at the display.

13. The processor of claim 11, the one or more processing units further to determine to update a preceding dynamic seam placement for a preceding time slice with the dynamic seam placement for a current time slice based at least on the indicator representing at least one of that the monitored person is experiencing the saccade or that the monitored person is looking away from the display.

14. The processor of claim 11, the one or more processing units further to determine, based at least on the indicator representing that the monitored person is at least one of experiencing the saccade or that the monitored person is looking away from the display, adjust a filter that limits a rate of movement of the stitching seam from a preceding dynamic seam placement for a preceding time slice to the dynamic seam placement for a current time slice.

15. The processor of claim 11, wherein the processor is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system for performing remote operations;
   a system for performing real-time streaming;
   a system for generating or presenting one or more of augmented reality content, virtual reality content, or mixed reality content;
   a system implemented using an edge device;
   a system implemented using a robot;
   a virtual or augmented reality system;
   a gaming system;
   a teleconferencing system;
   a system for performing conversational AI operations;
   a system for generating synthetic data;
   a system incorporating one or more virtual machines (VMs);
   a system implemented at least partially in a data center; or
   a system implemented at least partially using cloud computing resources.

16. A system comprising:
   one or more processing units to generate a composite frame based at least on a dynamic seam placement of a seam between two or more frames, the dynamic seam placement determined based at least on controlling one or more constraints on movement of the dynamic seam placement using a state of an indicator representing whether at least one of a monitored person is experiencing a saccade or the monitored person is looking away from a display.

17. The system of claim 16, the one or more processing units further to determine the dynamic seam placement based at least on determining a non-linear path for the seam using seam carving using an energy function that includes a term having a value that depends on the state of the indicator.

18. The system of claim 16, wherein the state of the indicator is generated using one or more eye tracking algorithms.

19. The system of claim 16, wherein the controlling of the one or more constraints comprise determining to suppress an update to the display in a subsequent time slice based at least on the state of the indicator representing at least one of that the monitored person is not experiencing the saccade or that the monitored person is looking at the display.

20. The system of claim 16, wherein the system is comprised in at least one of:
   a control system for an autonomous or semi-autonomous machine;
   a perception system for an autonomous or semi-autonomous machine;
   a system for performing simulation operations;
   a system for performing digital twin operations;
   a system for performing deep learning operations;
   a system for performing remote operations;
   a system for performing real-time streaming;
   a system for generating or presenting one or more of augmented reality content, virtual reality content, or mixed reality content;
   a system implemented using an edge device;
   a system implemented using a robot;
   a virtual or augmented reality system;
   a gaming system;
   a teleconferencing system;
   a system incorporating one or more virtual machines (VMs);
   a system implemented at least partially in a data center;
   a system for performing light transport simulation;
   a system for performing collaborative content creation for 3D assets;
   a system for generating synthetic data; or
   a system implemented at least partially using cloud computing resources.

* * * * *